(12) United States Patent
Haas, Sen. et al.

(10) Patent No.: US 6,227,103 B1
(45) Date of Patent: May 8, 2001

(54) MACHINE FOR FORMING CONES

(75) Inventors: Franz Haas, Sen., Vienna; Johann Haas, Klosterneuburg; Fritz Obermaier, Krems, all of (AT)

(73) Assignee: Franz Haas Waffelmaschinen-Industrie Aktiengesellschaft, Vienna (AT)

( * ) Notice: Subject to any disclaimer, the term of this patent is extended or adjusted under 35 U.S.C. 154(b) by 0 days.

(21) Appl. No.: 09/462,058

(22) PCT Filed: Jul. 23, 1998

(86) PCT No.: PCT/AT98/00178

§ 371 Date: Dec. 29, 1999

§ 102(e) Date: Dec. 29, 1999

(87) PCT Pub. No.: WO99/04639

PCT Pub. Date: Feb. 4, 1999

(30) Foreign Application Priority Data

Jul. 23, 1997 (AT) .................................................. 1249/97

(51) Int. Cl.[7] ........................... A21C 15/02; A21C 11/00; A21D 13/00; A21D 8/00

(52) U.S. Cl. ................................ 99/354; 99/353; 99/383; 99/442; 99/450.2; 425/317; 425/322; 425/334; 425/347; 425/397

(58) Field of Search ............................. 99/335, 352–355, 99/361, 372–384, 426–428, 439, 442, 443 R, 443 C, 450.1–450.7; 425/319, 322, 397, 422, 438, 443, 317, 334, 347; 426/231–233, 496, 390, 501, 512, 514, 523

(56) References Cited

U.S. PATENT DOCUMENTS

| 1,804,039 | 5/1931 | Tatosian . | |
| 4,694,741 | * 9/1987 | Haas, Sr. et al. | 99/354 |
| 5,032,414 | * 7/1991 | Haas et al. | 99/335 X |
| 5,693,355 | * 12/1997 | Haas | 99/383 X |

* cited by examiner

Primary Examiner—Timothy F. Simone
(74) Attorney, Agent, or Firm—Herbert Dubno

(57) ABSTRACT

A machine for making cones from baked wafers utilizes roll-up mechanism in the form of a roll-up mandrel and a roll-up form. A multiplicity of such mechanisms is carried by a chain along an endless path. Each roll-up mechanism can have a frame on which the roll-up mandrel and roll-up form is mounted.

2 Claims, 4 Drawing Sheets

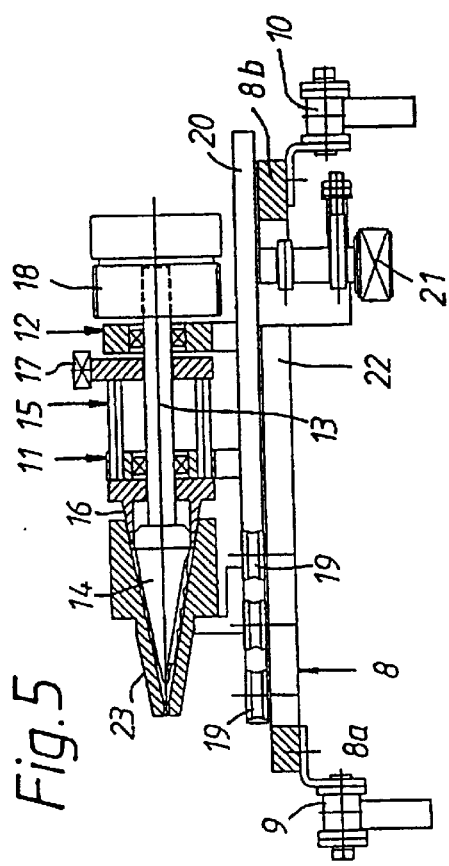
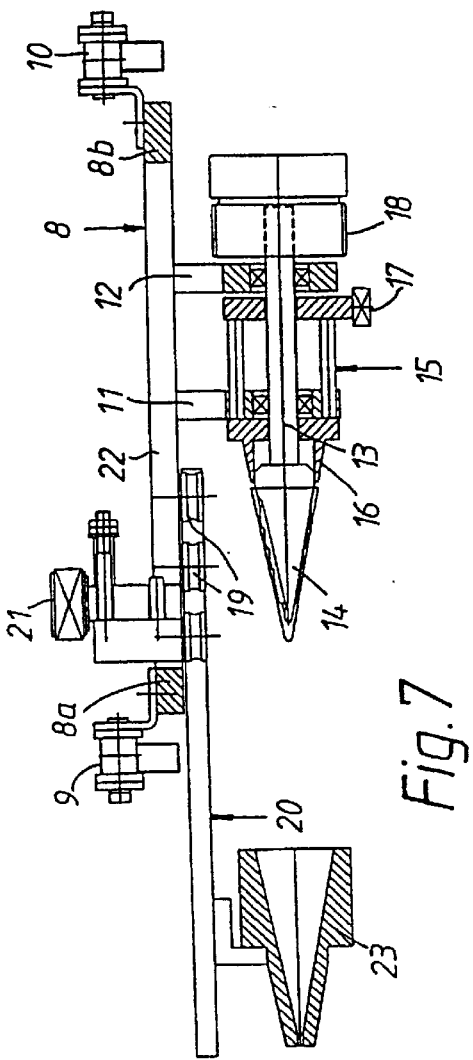
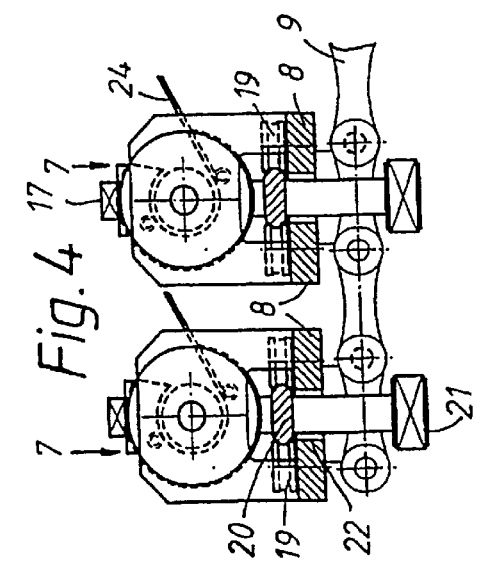
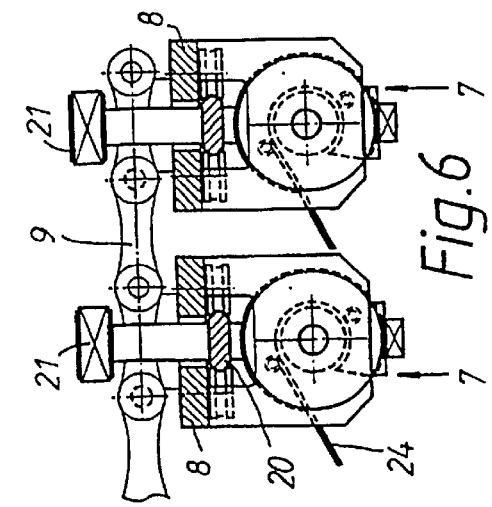

MACHINE FOR FORMING CONES

CROSS REFERENCE TO RELATED APPLICATIONS

This application is a national stage of PCT/AT98/00178 filed Jul. 23, 1998 and based upon Austrian national application A 1249/94 filed Jul. 23, 1997 under the International Convention.

TECHNICAL FIELD

The invention relates to a cone-making machine for producing rolled-up wafer cones from individual, substantially flat, baked wafer cakes made of sugar-containing wafer dough and therefore plastically deformable when hot. The cone-making machine has several roll-up mechanisms arranged next to one another along a closed circumferential path, wherein the wafer cakes are rolled up and the resulting cones are allowed to cool, while the roll-up mechanisms are transported in a stationary machine housing from a loading station to a discharge station for the wafer cones.

STATE OF THE ART

Cone-making machines for the production of rolled-up wafer cones are arranged mostly close to the discharge station of a continuously operating wafer-baking over in which substantially flat wafer cakes, which are plastically deformable when hot, are produced from a sugar-containing wafer dough. The wafer cakes are transferred to the cone-making machine while still in a warm, plastically deformable sate, where they are rolled up and the resulting cones are allowed to cool down.

For the production of wafer cakes longitudinally extending wafer-baking ovens are used. Such ovens have endless baking-tong chains which revolve continuously and have baking tongs each containing a baking mold consisting of two flat baking plates for the production of wafer cakes. These wafer-baking ovens have a longitudinally extending oven housing, which on the outside has a heat-insulating end closure consisting of doors and plates. In the over housing a longitudinally extending parallellepipedic inner space is provided, through which extends the endless baking tong chain through two superimposed transport levels and over two guide mechanisms provided respectively at each end of the inner space. The length, widths and height of this inner space depend on the size of the substantially rectangular baking tongs and the length of the baking tong chains. The size of the baking tongs is selected according to the size of the wafer cakes to be produced. The width of the inner space is primarily determined by the width of the baking tongs. The length of the baking tongs determines the diameter of the guide mechanisms of the baking tong chain, by determining the vertical distance between the two transport levels, and thereby the height of the inner space. The length of the inner space depends on the number of baking tongs on the baking tong chain, respectively on the length of the baking tong chain. The height of the inner space, together with the legs of the oven housing, determines the position of the upper transport level of the baking tong chain or of the wafer-baking oven.

In the upper transport level of the baking oven, a discharge or wafer removal station wherein the baked wafer cakes are removed from the opened baking molds, a dough-pouring station, wherein flowable wafer dough is poured into the empty, opened baking molds, are arranged in succession in the travel direction of the baking tong chain. In the travel direction of the baking tong chain, the dough-pouring station is followed by a long baking space, which ends shortly before the wafer removal station and which contains the baking tong chain segment located in the lower transport level. The baking tong chain revolves at a constant speed and transports the closed baking tongs through the longitudinally extending baking space provided with gas burners. After leaving the baking space, the baking tongs are released for the opening of the baking molds and are again clamped together after passing through the dough-pouring station thereby closing the baking molds.

During one revolution of a baking tong, at the dough-pouring station a precisely measured amount of a flowable wafer dough with a high sugar content is poured onto the lower baking plate of an open baking mold. After the dough-pouring station, the baking mold is closed by clamping together the baking tongs. While the closed baking tongs travel through the baking space, from the dough portion a wafer cake is formed inside, which is plastically deformable while warm. Before reaching the discharge station, the baking mold is opened by releasing the baking tongs. At the discharge station the wafer cake is removed from the opened baking mold and transferred to the cone-making machine in a plastically deformable state, while the baking tong is transported further to the dough-pouring machine for the production of the next wafer cake. The travel time of the baking tongs form the dough-pouring station through the baking space to the discharge station corresponds to the predetermined baking time of the wafer cake.

The production capacity of the baking oven depends mainly on the number of baking plates which are transported by the baking tongs chain at a constant speed during the predetermined baking time from the dough-pouring station through the baking space to the discharge station. The running speed of the baking tongs chain is selected so that each baking tong will complete its travel from the dough-pouring station through the baking space to the discharge station within the predetermined baking time. The wafer cakes baked in the baking tongs are removed from the opened baking molds at the discharge station at a predetermined work pace.

In order to increase the production capacity of the baking oven it is enough to lengthen the baking tongs chain by a few baking tongs and to increase the running speed of the baking tongs chain, so that each baking tongs will complete the lengthened travel path in the predetermined baking time of the wafer cakes. The lengthening of the baking tongs chain requires merely a lengthening of the oven housing in the area of the baking space. Only the long inner space comprising the baking tong chain is lengthened. Its width and height remain the same. Likewise the width and the height of the oven housing, as well as the position of the upper transport level of the baking oven. Lengthening the baking tongs chain and the oven housing offers almost limitless possibilities and is actually limited only by the rotational speed of the baking tongs chain.

These longitudinally extending baking ovens are combined with cone-making machines, wherein a rigid rotary frame revolving around a stationary rotation axis comprises roll-up mechanisms assigned to the baking molds of the baking oven, which are transported by the rotary frame in a closed circuit from a loading station through a work path to a discharge station, while the plastically deformable wafer cakes pulled in by them at the loading station are rolled up into cones, and the cones are allowed to cool in order to increase the stability of their shape. The rotational speed of the rotary frame depends on the one hand on the distance between the roll-up mechanisms on the rotary frame, as well as on the distance between the baking plates in the baking tongs chain and its rotational speed, on the other hand. The diameter of the rotary frame on which the roll-up mechanisms are mounted depends on the cone production time, which starts with the moment when the wafer cake is received in the roll-up mechanism and ends when the sufficiently cooled wafer cone is stripped off the punch, and that additional time which is required for returning the punch into the die. In the roll-up mechanism the wafer cones are produced during a predetermined cone production time, which is required for rolling up a wafer cake and the subsequent cooling of the resulting cone, and which depends mainly on the size of the wafer cake and the size of the cone. This cone production time, together with the rotational speed of the baking tong chain, determines the length of the work path of the cone-making machine, and thereby the diameter of the circular path of the roll-up mechanisms, respectively of the rotary frame, wherein loading station and discharge station are mostly diametrically opposed to each other.

The production capacity of the cone-making machine is determined by the number of the roll-up mechanisms arranged next to each other on the rotary frame along the work path, which are transported by the rotary frame from the loading station through the work path to the discharge station. Therefore the production capacity of the cone-making machine depends mainly on the size of the rigid rotary frame, which is selected in accordance with the predetermined cone producing time and the rotational speed of the rotary frame predetermined by the travel speed of the baking tongs chain of the wafer-baking oven.

The size of the rotary frame is selected in accordance with the maximal baking time of the respective wafer-baking oven. Because of cost reasons, baking ovens with sizes corresponding to rotary frames with 8, 10, 12, 14, 16 18 or 20 roll-up mechanisms corresponding to the side of the wafer-baking oven are used. The size of the cone-making machine or the number of its roll-up mechanisms is determined by the baking time and the number of the baking plates of the baking tongs chain, as well as by the required cooling time of the rolled-up cones. Therefore a later increase of the number of baking plates of the wafer-baking oven is as a rule limited by the number of roll-up mechanisms of the cone-making machine.

The rigid rotary frame of the known cone-making machines provides mostly two circular frame disks perpendicular to the axis of rotation, which are rigidly interconnected via axial support rods. The roll-up mechanisms are received in the rotary frame between the two frame disks and arranged along the outside of the rotary frame at equal distances. Each roll-up mechanism is arranged with its rolling axis parallel to the central axis of the rotary frame and has a cone-shaped die coaxial with the rolling axis, with a lateral feeding slot for the wafer cake. The die is fastened rigidly to the frontal frame disk.

A punch shaft coaxial with the rolling axis of the roll-up mechanism has at its frontal end a spherical punch and at its rear end a driving wheel. The punch shaft is pivoted in an axially slidable carriage in the rotary frame, but axially immovable. The carriage sits on two guide columns parallel to the rolling axis and which are rigidly anchored to the two frame disks and carries an outward projecting control element. The control elements of the carriage engage in stationary cams, which are provided along the outside of the rotary frame and which derive axial displacement motions of the punches connected with the carriage from the rotation of the rotary frame. In order to set the punches into temporary rotation, in the area of the loading station there is a stationary driving station with a stationary driving device for the punches, by means of whose continuously rotating drive member the drive wheel of the punch shaft is brought into engagement through the rotating motion of the rotary frame.

During one rotation of the rotary frame, in each roll-up mechanism at first the carriage is axially pushed forwards while passing through the empty section and before reaching the loading station, in order to introduce the punch into the die. When passing the stationary drive station, the punch is set to perform a few rotations within the die, while the rotary frame moves the roll-up mechanism through the first section of the work path, thereby moving the drive wheel of the punch shaft along the continuously rotating drive member. The rotating punch pulls in a wafer cake introduced from the loading station into the die through the lateral feeding slot and rolls it up into a cone. While the rotary frame moves the roll-up mechanism through a second section of the work path, the carriage is axially retracted and thereby the punch with the thereto adhering wafer cone is completely extracted from the die, so that the resulting cone can cool down outside the die during the further travel of the roll-up mechanism, in order to increase the shape stability of the rolled-up cone. At the end of the work path the carriage is again axially displaced when it reaches the discharge station, in order to strip the cooled, stable-shaped wafer cone off the punch. Subsequently the roll-up mechanism is transported by the rotary frame through the empty section and the production cycle for the next wafer cone starts.

Cone-making machines with standing rotary frames are known, which at the discharge stations of a longitudinally extending wafer-baking oven are integrated in its housing. The rigid rotary frame rotates about a vertical rotational axis arranged at the side wall of the oven housing and projects with its frame disks above the upper transport level of the baking oven up to its discharge station. The rolling-up mechanisms arranged vertically with their rolling axes are moved along a closed circular path which intersects the rectilinear horizontal motion path of the open baking molds at the discharge station of the baking oven. The open baking molds run through the discharge station of the baking oven with baking plates arranged obliquely with respect to the upper transport level. The baked wafer cakes are picked up from the upper transport level by the die of the roll-up mechanisms. The dies are provided with blades which precede their feeding slots and ride along the obliquely arranged upper baking plates. During the rotation of the rotary frame, the wafer cakes are rolled into cones in the die and the punches are extracted upwards from the dies for the cooling of the thereto adhering wafer cones and are moved into a raised position. At the discharge station the stable-shape wafer cones are detached from the raised punches and are permitted to fall down a transport chute with their cone points first. The rotary frame is rotatably supported in the stationary machine housing of the cone-making machine, below the upper transport level of the wafer-baking oven.

Also cone-making machines with horizontal rotary frames are known, which are arranged at the discharge station of a longitudinally extending wafer-baking oven, next to its oven housing. The rigid rotary frame rotates in the stationary machine housing of the cone-making machine about a horizontal axis of rotation, and moves the roll-up mechanisms arranged horizontally with their rolling axis along a closed circular path from the loading station located at the height of the upper transport level of the baking oven to the discharge station of the cone-making machine. During the rotation of the rotary frame, in each roll-up mechanism a wafer cake is rolled into a cone and the resulting cone is displaced into a cooling position by the horizontal displacement of the punch, wherein the cone cools down until it reaches the discharge station. At the discharge station the cone which in the meantime has acquired a stable shape, is detached from the punch and left to fall downwards out of the roll-up mechanism.

Between the wafer-baking oven and the cone-making machine a transfer device is provided, which transports the plastically deformable wafer cakes from the very hot baking molds of the wafer-baking oven to the considerably cooler roll-up mechanisms of the cone-making machine and whose work pace is synchronized with that of the wafer-baking oven and of the cone-making machine.

The transfer device has a rotary star frame rotating about a vertical axis, which at the end of its star-shaped work arms has small stamps by means of which it seizes the wafer cakes at their upper side and pulls them on an arched horizontal slide from the discharge station of the wafer-baking oven to the loading station of the cone-making machine. Each stamp is applied with minimal pressure to the upper side of the wafer cake which are easily deformable in their plastically deformable state, in order to keep at a minimum the friction between the wafer cake and the slide, in order to avoid deformation of the wafer cake during transport. The length of the slide running along an arc of circle determines together with the rotational speed of the rotary stellar frame the transport time required for the travel through the transfer device, as well as the change in the consistency of the wafer cakes depending thereon.

In order to insure the plastic deformability of the wafer cones arriving at the roll-up mechanisms, the cooling of the wafer cakes occurring during their passage through the transfer device, and the therewith necessarily connected reduction of their plastic deformability, cannot surpass a certain limit. This establishes the maximal length of the slide depending on the rotational speed of the rotary stellar frame. This also determines the maximum horizontal distance between the discharge station of the wafer-baking oven and the loading station of the cone-making machine, which depends on the radius and the length of the slide.

The slide is formed by a guide plate which runs horizontally along the arched slide path. In order to bridge slight height differences between the discharge station of the wafer-baking machine and the loading station of the cone-making machine, the guide plate can slope slightly upwards or downwards with respect to the horizontal. Since the transport of wafer cakes over an inclined guide plate requires the stamps to apply more pressure to their upper side, very strict limits are set to the inclination of the guide plate, in view of the hot, plastically deformable wafer cakes.

Cone-making machines with horizontally arranged rotary frames are known, wherein the loading station is arranged at the upper extremity of the rotary frame close to the upper transport level of the wafer-baling oven, while the discharge station is arranged at the lower extremity of the rotary frame, close to the floor on which the wafer-baking oven is located. The rolled wafer cones produced during the rotation of the rotary frame fall out of the cone-making machine at the discharge station onto a lower transport device, which transports the rolled wafer cones to a cooling device. In those cone-making machines the maximal size of the rotary frame is determined by the vertical distance of the lower transport device from the loading station of the cone-making machine, which is arranged close to the upper transport level of the wafer-baking oven. The outer diameter of the rotary frame has to be smaller than the overall height of the wafer-baking oven.

Cone-machines with a horizontal rotary frame are known, wherein the rotary frame rotates about a horizontal axis close to the upper transport level of the wafer-baking oven, and the loading station and discharge station are also arranged close to the upper transport level of the wafer-baking oven, on opposite lateral extremities of the rotary frame. In these cone-making machines the maximum size of the rotary frame is determined by the vertical distance between its rotation axis in the neighborhood of the upper transport level of the wafer-baking oven and the floor on which it is erected.

In the cone-making machines with horizontally arranged rotary frames only a slight rise in the slide of the transfer device can be achieved, but the height difference which has to be overcome in this way is very limited, so that enlargement of the rotary frame only slightly diminishes the limitations imposed by the construction of the wafer-baking oven.

The upper limits set by the construction type of the longitudinally extending wafer-baking oven for the size of the rotary frame of the pertaining cone-making machine are determined by those dimensions of the oven housing which have no influence on the production capacity of the respective wafer-baking oven and which are adjusted to the width or length of the baking tongs determined by the size of the wafer cakes to be produced. An enlargement of these dimensions is not possible without disadvantages for the wafer-baking oven.

OBJECT OF THE INVENTION

It is the object of the invention to indicate a new cone-making machine with a space-saving arrangement of the roll-up mechanisms.

SUMMARY OF THE INVENTION

The cone-making machine for the production of rolled wafer cones from individual, substantially flat, baked wafer cakes according to the invention has several roll-up mechanisms arranged next to one another in a stationary machine housing along a closed circular path, along which the wafer cakes are rolled up into cones between a form and a mandrel, while the roll-up mechanisms travel along their circular path from a loading station introducing the wafer cakes into the roll-up mechanisms to a discharge station for removing the rolled wafer cones from the roll-up mechanisms. The cone-making machine of the invention is characterized in that an endless chain of roll-up mechanisms extending along the circular path is provided, each of them having a support frame carrying a mandrel and a form and which is fastened on two transport chains running parallel to one another along the circular path.

This construction makes possible an almost unlimited multiplication of the number of roll-up mechanisms by lengthening the roll-up mechanism chain. The cone-making machine of the invention allows for an increase of its productivity adjusted to the capacity of the longitudinally extending baking oven. The work path of the cone-making machine extending between the loading station and the discharge station can be lengthened at will, independently of the running speed of the baking tongs chain of the wafer-baking oven, in order to observe the predetermined minimal time required for the production of rolled wafer cone sufficiently stable for further transportation.

In the cone-making machine of the invention, the path of the roll-up mechanism chain and thereby the shape of the circular path of the roll-up mechanisms can be adjusted to the space requirements on the site of the wafer-baking oven. The path of the roll-up mechanism chain can comprise rectilinear segments as well as curved segments.

In the cone-making machine of the invention, the position of the discharge station can be selected independently from the position of the loading station and the path of the roll-up mechanism chain can be correspondingly adjusted. For instance the discharge station of the cone-making machine can be located higher than the loading station, so that a transport device arranged downstream of the cone-making machine for overcoming the height difference can be eliminated.

According to a further feature of the invention, it can be provided that each roll-up mandrel coaxial with the rolling axis be arranged at the frontal end of a shaft rotatably supported in the support frame and axially immovable, this shaft being set to rotate via a drive wheel, while the roll-up form coaxial with the rolling axis and acting together with the mandrel is arranged on a carriage which is slidable in the support frame, parallel to the rolling axis.

This design yields a more compact construction of the roll-up mechanisms with shorter and more rigidly supported punch shafts.

According to a further feature of the invention, the roll-up mechanisms is arranged along a circular closed path, which extends in the machine stationary machine housing over two spaced apart guiding devices and through two superimposed transport levels. The roll-up mechanisms are interconnected by two endless transport chains running parallel to each other along the circular path, forming an endless roll-up mechanism chain. One guiding device of the roll-up mechanism chain can be arranged in the area of the loading station.

The two superimposed transport levels of the roll-up mechanism chain can be arranged horizontally or at an angle with respect to the horizontal.

BRIEF DESCRIPTION OF THE DRAWING

In the drawing:

FIG. 4 is a side view of a segment of the roll-up mechanism chain in the upper transport level of the cone-making machine;

FIG. 5 is a vertical section through the roll-up mechanism chain in the area of the upper transport level of the cone-making machine corresponding to FIG. 4;

FIG. 6 is a side view of a segment of the roll-up mechanism chain in the lower transport level of the cone-making machine; and FIG. 7 is a vertical section through the roll-up mechanism chain in the area of the lower transport level of the cone-making machine corresponding to FIG. 6.

SPECIFIC DESCRIPTION

Figure 1:
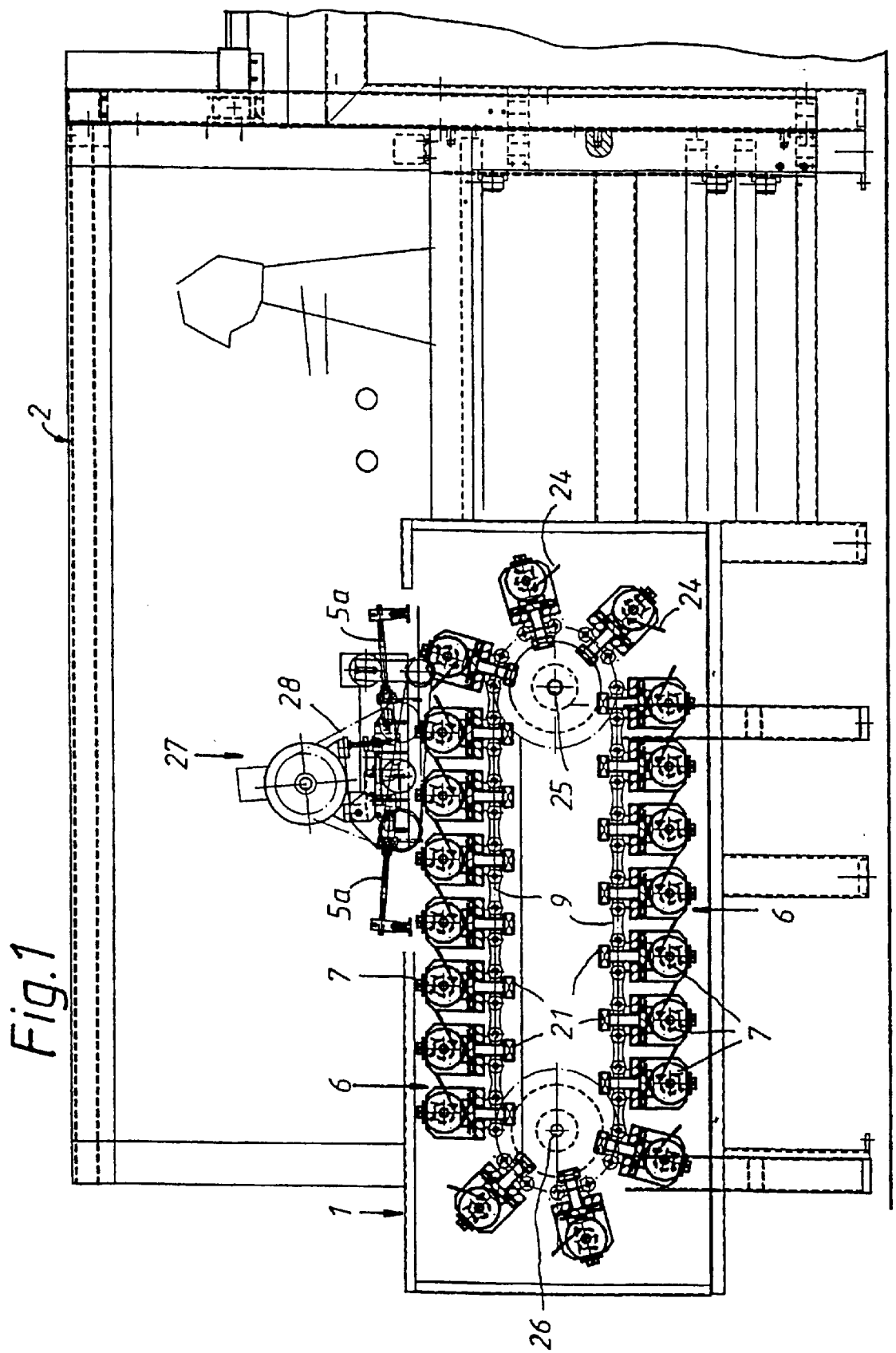
FIG. 1 is a side view of a first embodiment example of a cone-making machine with horizontally arranged transport levels of the roll-up mechanism chain, arranged next to a longitudinally extending baking oven.

FIG. 1 shows a longitudinally extending cone-making machine 1, which is arranged laterally next to the discharge station of a longitudinally extending wafer-baking oven 2, wherein the substantially flat wafer cakes, which will be rolled into cones, are individually produced from a liquid wafer dough with a high sugar content.

The longitudinally extending wafer-baking oven 2 contains an endless baking tongs chain running through two superimposed horizontal transport levels, whose baking tongs 3, 4 (FIG. 3) contain baking molds wherein the wafer cakes are baked. In the area of the upper horizontal transport level of the baking tong chain, at the wafer removal station of the wafer-baking oven 2, the baked wafer cakes are transferred from the opened baking molds of the opened baking tongs 3 to a transfer device 5, which feeds the wafer cakes in a warm, plastically deformable state to the loading station of the cone-making machine 1.

Figure 2:
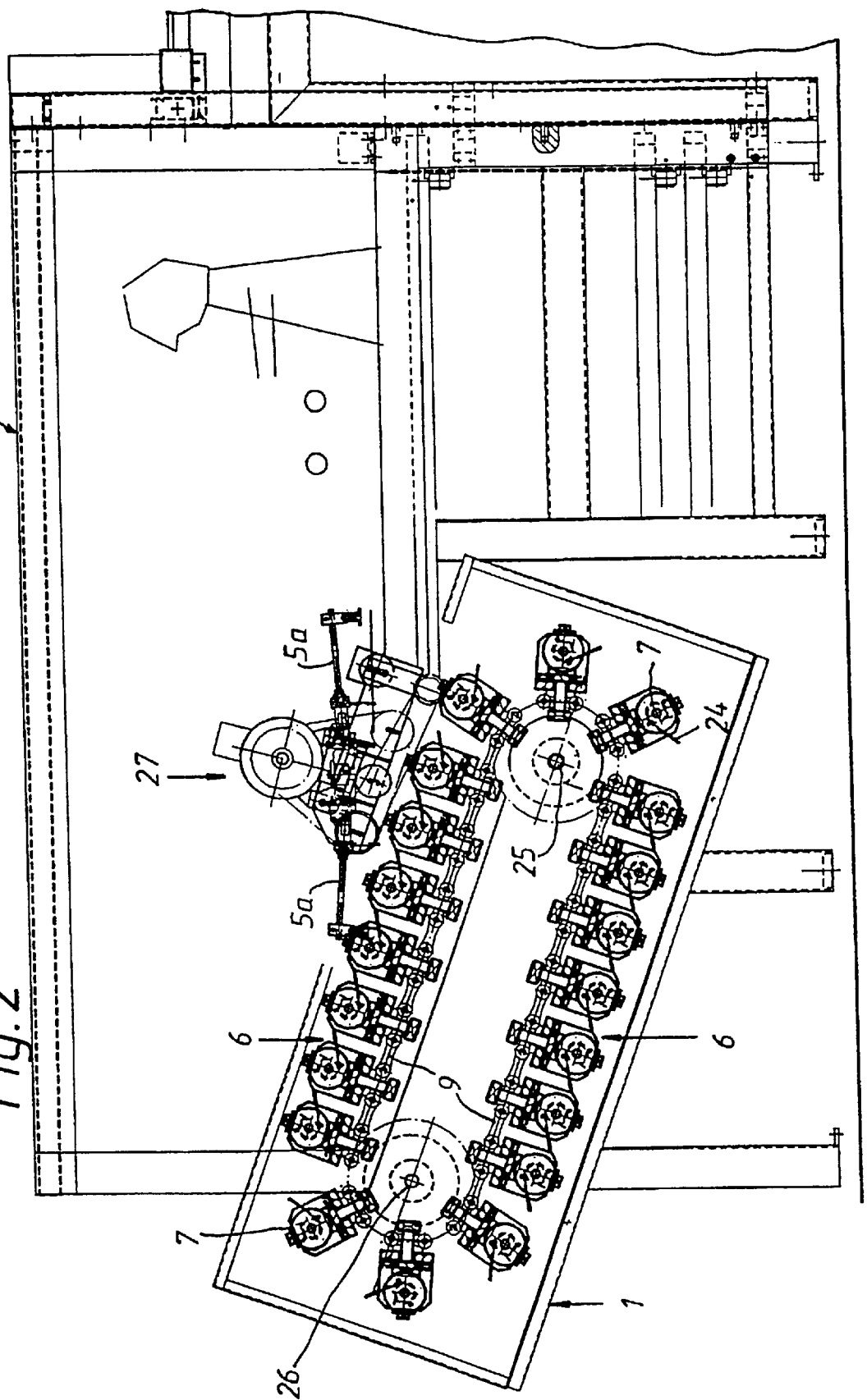
FIG. 2 is a side view of a second embodiment of a cone-making machine wherein the transport levels of the roll-up mechanism chain are inclined with respect to the horizontal, arranged next to a longitudinally extending baking oven.

The longitudinally extending cone-making machine 1 comprises an endless, continuously revolving roll-up mechanism chain 6, which travels through two superimposed transport levels, which in the embodiment of FIG. 1 are horizontally arranged and in the embodiment of FIG. 2 rises obliquely upwards from the loading station. The baked wafer cakes are fed individually in a warm, plastically deformable state to the roll-up mechanisms 7 of the roll-up mechanism chain 6 and are there rolled up into cones. These cones are permitted to cool, so that they will assume the crisp-brittle consistency typical for crisp wafers.

Figure 3:
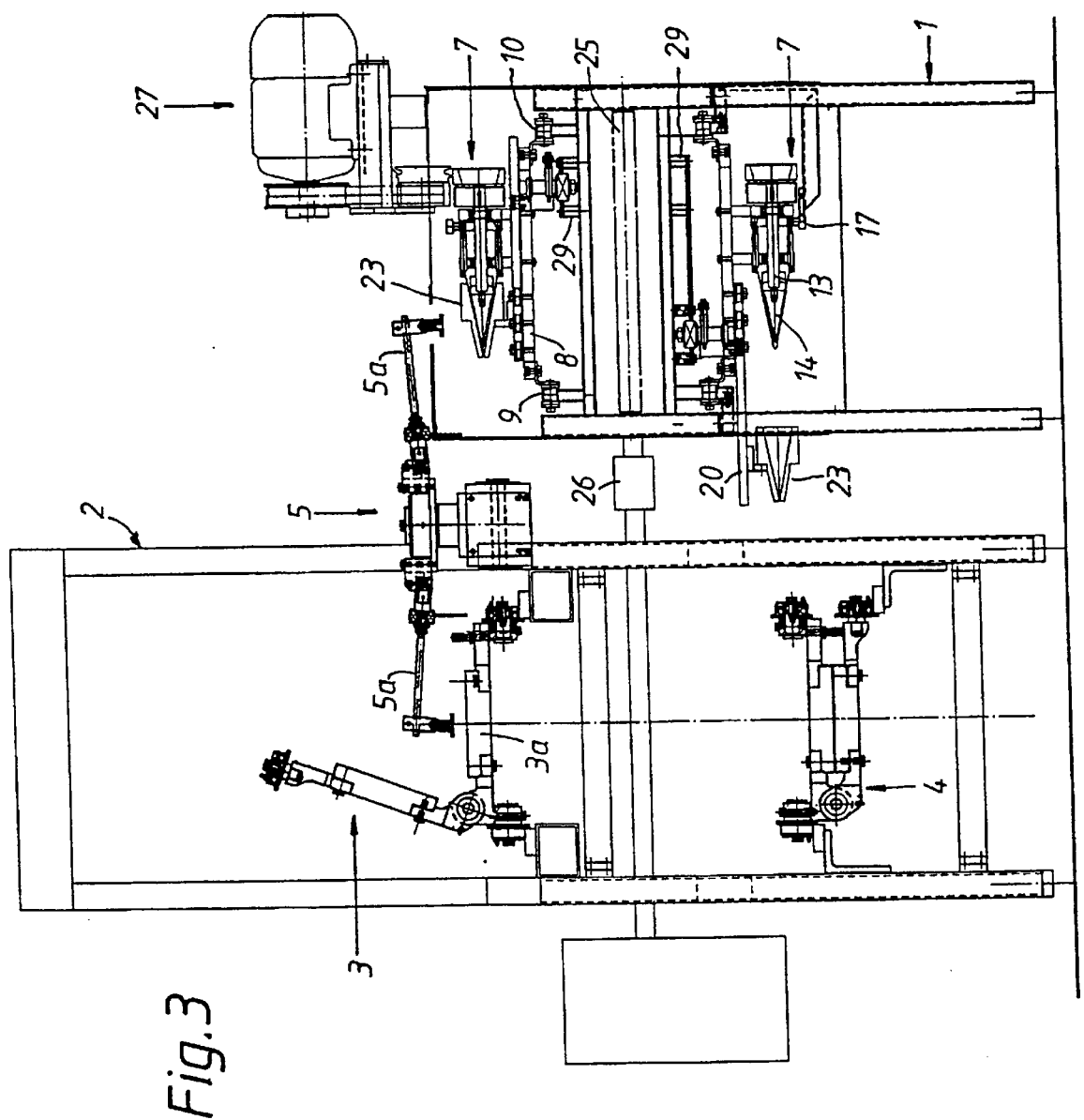
FIG. 3 is a vertical section through the wafer removal station of the wafer-baking oven and through the loading station of the cone-making machine arranged next to it.

The wafer cakes are removed from the lower baking plate 3a of the opened baking tong 3 of the baking tong chain and are transported individually by means of the arms 5a of the transfer device 5 in a half circle from the wafer removal station of the wafer-baking oven 2, shown to the left in FIG. 3, to the loading station of the cone-making machine 1, shown to the right in FIG. 3, and there are fed to a roll-up mechanism 7 of the roll-up mechanism chain 6. The roll-up mechanism chain 6 of the cone-making machine 1 runs in a direction opposite to that of the baking tong chain of the wafer-baking oven 2.

The roll-up mechanism chain comprises the roll-up mechanisms 7 arranged next to each other in its rotation direction, each with its own support frame 8 and with the rolling axis arranged perpendicularly to the direction of rotation. The support frame 8 has a longitudinal axis parallel to the imaginary rolling axis of the roll-up mechanism 7 and at its frontal end 8a facing the wafer-baking oven 2 is connected with an endless frontal transport chain 9, and at its rear end 8b facing away from the wafer-baking oven 2, is connected with an endless rear transport chain 10. The support frames 8 fastened to the two transport chains 9, 10 point upwards with their upper sides in the upper transport level of the roll-up mechanism chain 6 and downwards in the lower transport level of the roll-up mechanism chain 6.

In each roll-up mechanism 7 the support frame 8 has at its upper side two bearings 11, 12 arranged one after the other along the imaginary rolling axis of the roll-up mechanism, wherein a shaft 13 is rotatable and axially immovably supported. The mandrel 14 of the roll-up mechanism 7 arranged close to the frontal end 8a of the support frame 8 is fastened to the frontal end of the shaft. In the area of the frontal bearing 11 an ejector 15 for the rolled-up cones is axially movable arranged on the shaft 13. The ejector 15 has at its frontal end a sleeve 16 coaxial with the rolling axis, which projects axially beyond the rear end of the mandrel 14. On the upper side of the ejector 15, an actuation member 17 is fastened, by means of which the ejector 15 can be moved back and forth axially along the shaft 13. At the rear end of the shaft 13 a drive wheel 18 close to the rear end 8b of the support frame, is arranged, by means of which the shaft 13 together with the mandrel 14 can be made to rotate.

Further on the upper side of the support frame 8, a carriage guide 19, parallel to the imaginary rolling axis, is provided, wherein a carriage 20 can be slidably guided, parallel to the rolling axis. The carriage guide 19 is formed by guide rolls arranged one after the other on both sides of the carriage 20. At the bottom side of the carriage 20 an actuation member 21 is fastened close to its rear end, by means of which the carriage 20 can be moved back and forth in the carriage guide 19, parallel to the shaft 13. The actuation member 21 extends from the bottom side of the carriage 20 perpendicularly to the rolling axis and projects downwards beyond the bottom side of the support frame 8, through a longitudinal slot 22 parallel to the rolling axis of the support frame 8. The roll-up die or form 23 coaxial with the imaginary rolling axis is mounted on the frontal end segment of the carriage 20, the conical inside of the same is open downwards towards the mandrel 14. On the outside of the form 23 a guide plate 24 tangential to its conical inner space is fastened, which is close to the lateral feeding slot, not represented in the drawing, of the form 23.

The transport chains 9, 10 of the roll-up mechanism chain 6 are guided by frontal guide wheels sitting on common shaft 25 from the upper transport level of the roll-up mechanism chain 6 into the lower transport level, and are guided by lower guide wheels mounted on a common shaft 26 into the upper transport level of the roll-up mechanism chain 6. The cone-making machine 1 is arranged with its frontal chain guide of its roll-up mechanism chain 6 laterally next to the frontal chain guide of the baking tong chain of the wafer-baking oven 2. The shaft 25 bearing the frontal guide wheels of the transport chains 9, 10 is coaxial with the shaft bearing the frontal guide wheels of the baking tong chain and corotationally connected with the same through a coupling. This way the rotation of the frontal guide wheels of the roll-up mechanism chain and that of the baking tong chain are synchronized and the roll-up mechanism chain 6 moves in the opposite direction with respect to the baking tong chain.

For driving the mandrels 14 of the roll-up mechanisms 7, in the area of the loading station of the cone-making machine, a stationary drive station 27 is provided, the roll-up mechanisms 7 running past the same with the drive wheels 18 of their shafts 13 when the roll-up mechanism chain is revolving. The drive station 27 is provided with a continuously rotating belt member 28, a segment of which extends parallel to the path travelled by the driving wheels 18 of the roll-up mechanisms 7, while the roll-up mechanism chain 6 is revolving. When the rotating roll-up mechanisms 7 pass by the drive station 27, the drive wheels 18 mounted on the shafts 13 of the roll-up mechanisms 7 come into engagement with the drive member 28 of the drive station 27, causing the shafts 13 of the mandrels 14 to rotate for the duration of this engagement.

In order to roll up a wafer cake, the carriage 20 of the roll-up mechanism 7 is pushed into its rear position by means of an actuation member 21 (FIG. 5). Thereby the form 23 is pushed from the front onto the mandrel 14, whereby a gap is left between the conical inside of the form 23 and the conical outside of the mandrel 14. The wafer cake is introduced into this gap via the guide plate 24 through the feeding slot of the form 23, and is rolled about the mandrel 14 to form a cone by the mandrel 14 made to rotate by means of the drive member 28 of the drive station 27 via its drive wheel 18. Subsequently the carriage 20 is moved into its frontal position (FIG. 7) by means of its actuation member 21. Thereby the form 23 is forwardly pulled off the mandrel 14 on which the cone is left, and removed far enough from the mandrel 14 so that the cone can pass without difficulty between the form 23 and the mandrel 14. Subsequently the ejector 15 is pushed in a forward position by its actuation member 17, thereby stripping the cone off the mandrel 14. While the roll-up mechanism 7 is transported by the roll-up mechanism chain 6 from the discharge station of the cone-making machine 1 back to the loading station, the ejector 15 is moved back into its initial rear position via stationary guides of the cone-making machine engaging in its actuating member 17. At the same time, the carriage 21 carrying the form 23 is pushed back into its rear position via stationary guides 29 of the cone-making machine engaging in its actuation member 22.

What is claimed is:

1. A cone-making machine comprising an endless chain of roll-up mechanisms for rolling up flat wafer cakes into cones while moving along a closed endless path from a loading station for introducing flat wafer cakes into each roll-up mechanism to a discharge station for the rolled-up cones, each roll-up mechanism rolling up flat wafer cakes into cones between a rotatable roll-up mandrel defining a rolling axis and a roll-up form coaxial with said rolling axis and mounted on a roll-up form carrier movable parallel to said rolling axis, each roll-up mechanism comprising a respective frame in which said roll-up form carrier is movably supported and on which said roll-up mandrel is rotatably but axially immovably supported, each roll-up mechanism being fastened with the respective frame to at least two endless transport chains extending parallel to each other along said closed endless path from a lower transport level over first chain guiding devices in an area of said loading station to an upper transport level and over second chain guiding devices back to said lower transport level.

2. A cone-making machine comprising an endless chain of roll-up mechanisms for rolling up flat wafer cakes into cones while moving along a closed endless path from a loading station for introducing flat wafer cakes into each roll-up mechanism to a discharge station for the rolled-up cones, each roll-up mechanism rolling up flat wafer cakes into cones between a rotatable roll-up mandrel defining a rolling axis and a roll-up form coaxial with said rolling axis and mounted on a roll-up form carrier movable parallel to said rolling axis, each roll-up mechanism comprising a respective frame in which said roll-up form carrier is movably supported and said roll-up mandrel is arranged at a frontal end of a shaft which is rotatable by a drive wheel and rotatably but axially immovably supported in said rigid frame, each roll-up mechanism being fastened with the respective frame to at least two endless transport chains extending parallel to each other along said closed endless path from a lower transport level over first chain guiding devices in an area of said loading station to an upper transport level and over second chain guiding devices back to said lower transport level.

* * * * *